G. F. GODLEY.
DUST GUARD.
APPLICATION FILED MAY 29, 1911.
1,040,308.
Patented Oct. 8, 1912.
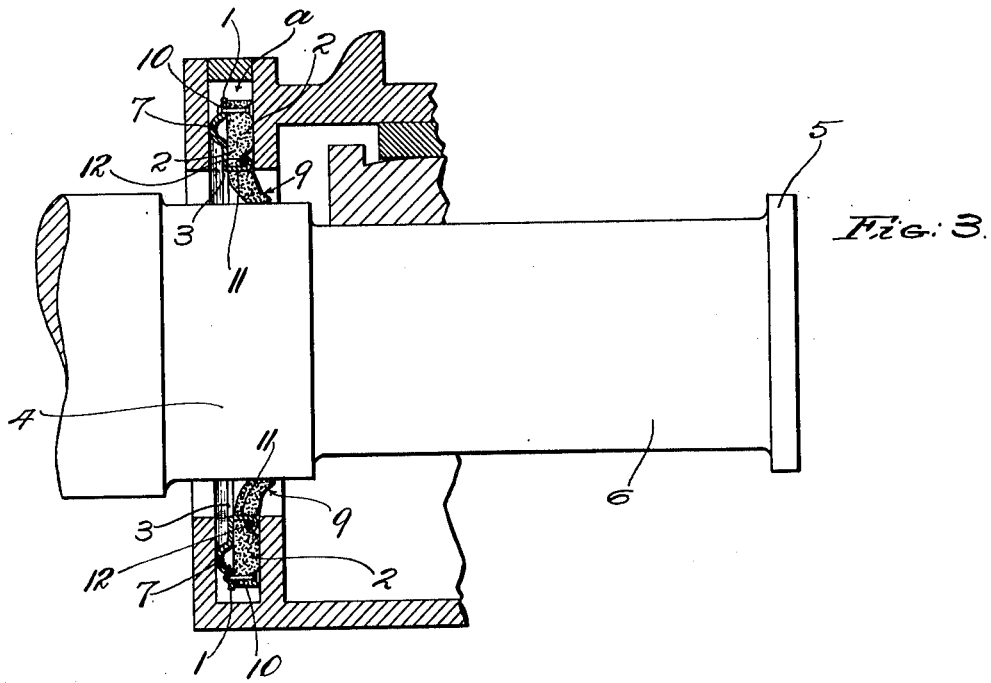
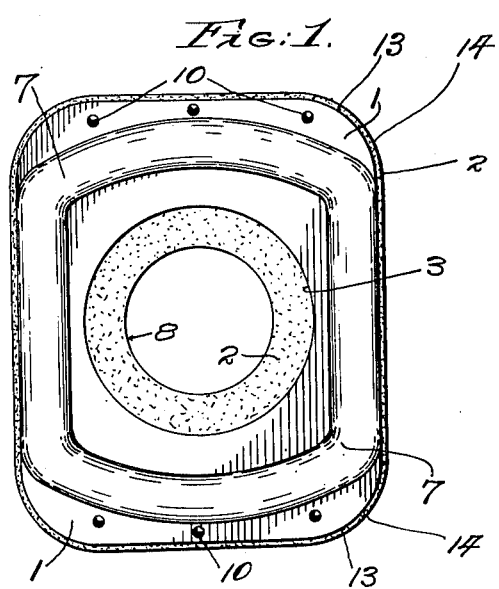
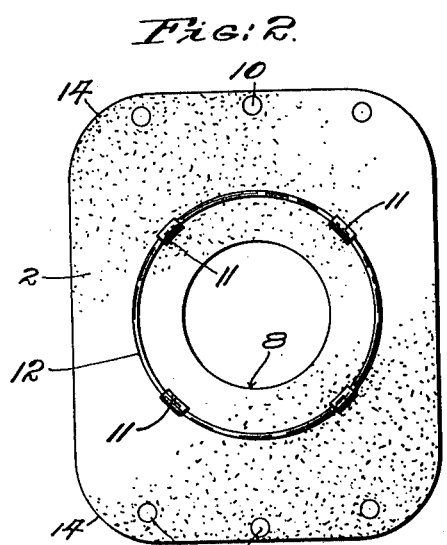
WITNESSES:
Agnes E. Caskey
Haines D. Albright
INVENTOR.
George F. Godley.
BY
William J. Jackson
ATTORNEY.

UNITED STATES PATENT OFFICE.

GEORGE F. GODLEY, OF PHILADELPHIA, PENNSYLVANIA.

DUST-GUARD.

1,040,308.  Specification of Letters Patent.  Patented Oct. 8, 1912.

Application filed May 29, 1911. Serial No. 630,086.

*To all whom it may concern:*

Be it known that I, GEORGE F. GODLEY, a citizen of the United States, residing at Philadelphia, in the county of Philadelphia and State of Pennsylvania, have invented certain new and useful Improvements in Dust-Guards, of which the following is a specification.

This invention relates to dust guards and has more particular relation to improvements upon the dust guard shown and described in United States Letters Patent, No. 838,707, granted to me under date of December 18, 1906.

The principal objects of the present invention may be said to reside in providing first, a light, simple, durable, reliable, efficient and comparatively inexpensive dust guard, which may be applied to existing types of journal boxes to improve the general usefulness thereof without necessitating change of structure of said boxes; and second, providing a dust guard which is so constructed and connected and so arranged with respect to a journal box that the said box may be readily fitted over the journal of an axle particularly the collar portion thereof, so that the said collar will not interfere with or jam the dust guard parts.

Other objects of the invention relate to the providing of general details of construction and arrangement of parts as will hereinafter more fully appear.

The invention consists of the improvements hereinafter described and finally claimed.

The nature, characteristic features and scope of the invention will be more fully understood from the following description taken in connection with the accompanying drawings forming part hereof and in which:

Figure 1, is a view in elevation of a dust guard embodying the invention, Fig. 2, is a similar view of the dust guard looking from the opposite side to that shown in Fig. 1, and Fig. 3, is a fragmentary view principally in section illustrating the application of a dust guard to a journal box.

Referring to the drawings which show the specific embodiment of the invention the dust guard is shown as being made up of a one-piece rigid member 1, and a one-piece pliable member 2. In practice, good results have been obtained by making the rigid member 1, from pressed sheet-metal provided with an axle opening 3, of a diameter considerably in excess of the diameter of the axle 4, or the collar 5, of the journal 6. The purpose of making the opening 3, of such large diameter will appear presently.

As shown in Fig. 3, the pressed sheet-metal portion of the dust guard is preferably provided adjacent its outer edges with a continuous rib or raised portion 7, which serves two purposes. First, this rib or raised portion 7, permits the use of comparatively thin sheet-metal in that said rib or raised portion 7, serves to provide in effect a substitute for a comparatively thick member as disclosed in my former patent aforesaid. In other words the member 1, while light in weight and thin is stiffened by the rib 7, and fills a good portion of the space between the walls of the dust guard pocket *a*. Second, by making the rib or raised portion 7, continuous, dust and dirt is prevented from reaching the interior of the box as would be the case, if in contradistinction from making the rib or raised portion 7, continuous, the member 1, were pressed out into a series of knobs or protuberances or if resilient pieces were stamped therefrom. The pliable member 2, which is preferably of felt, is shown as covering the entire outer face of the rigid member 1, and extends beyond the edges thereof and is uncorrugated and uncreased and is provided with an axle opening 8, which is a true circle and is of a diameter considerably smaller than the axle diameter. It will thus be seen that the axle opening in the rigid member is considerably larger than the axle diameter and that the axle opening of the pliable member is considerably smaller than either the opening in the rigid member or the diameter of the axle. By having the opening in the pliable member considerably smaller than the axle diameter there is provided when the parts are in position a rim or collar 9, for the pliable member 2, which hugs the axle 4, very snugly and serves to prevent dust and dirt from finding its way to the journal, also prevents oil escaping at the rear of the box. The pliable member 2, is comparatively thick as compared with the member 1, and is secured to the member 1, top and bottom by means of rivets 10, and is adapted to lie close against the inner wall of the pocket *a*, to prevent dust and dirt entering the box.

As shown in Fig. 3, the rigid member 1, is provided adjacent its axle opening 3, with radially arranged outwardly projecting ears 11, shown as being formed integral with the rigid member 1. In practice, the ears 11, are caused to puncture and penetrate the pliable member 2, and are then turned over upon themselves to retain in position a ring 12, (see Fig. 2), which is slightly embedded in the pliable material (see Fig. 3).

This construction and arrangement of parts serve to facilitate in securing together the rigid member and pliable material and also serve to assist in providing the annular rim or collar 9, before alluded to. The members 1, and 2, as shown are substantially rectangular in configuration and are provided respectively with rounded corners 13, and 14.

The above described dust guard is so arranged that the collar 5, of the journal 6, may readily pass through the opening 3, of the member 1. This is important, in that if the opening 3, were of the same diameter as the collar 5, the said collar would, when the axle box and guard were being withdrawn from the axle, jam the collar 9, of the pliable member back against the member 1, which obviously is disadvantageous, in that even if it were possible to withdraw the box, undue wear and tear of the parts takes place in endeavoring to withdraw the box from said collar. In other words as now constructed the pliable member is caused by the collar 5, to bend back and lie within the opening in the rigid member, thereby permitting the free withdrawal of the box.

What I claim is:

The combination with an axle of a dust guard comprising a comparatively thick pliable member having cut therein an axle opening which is a true circle and of a diameter smaller than the axle diameter said pliable member being capable of extension at its opening to form a rim or collar for closely hugging the axle, a continuous metallic ring surrounding said opening in the pliable member and a rigid member of sheet metal covering one face of the pliable member said rigid member having an axle opening therein of a diameter in excess of the axle diameter and having stamped therefrom a continuous rib or raised portion surrounding said axle opening said rigid member having stamped therefrom ears which extend outwardly, penetrating the pliable member and being clenched over said ring for securing the parts together.

In testimony whereof, I have hereunto signed my name.

GEORGE F. GODLEY.

Witnesses:
AGNES E. CASKEY,
WILLIAM J. JACKSON.